L. LARSON.
DISK HARROW SHARPENER.
APPLICATION FILED MAY 10, 1913.
1,083,687.
Patented Jan. 6, 1914.
2 SHEETS—SHEET 1.
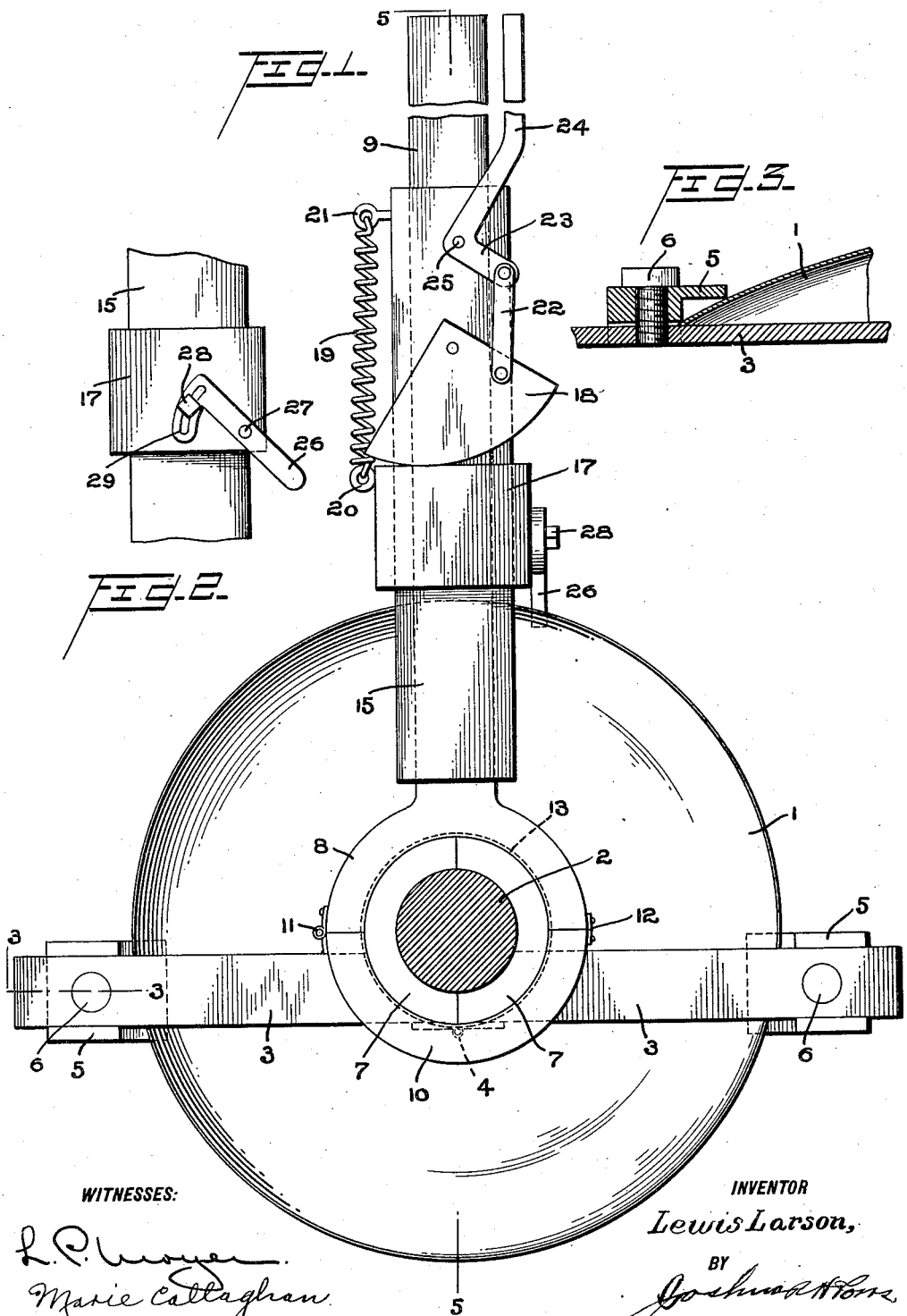
WITNESSES:
INVENTOR
Lewis Larson,
BY
ATTORNEY

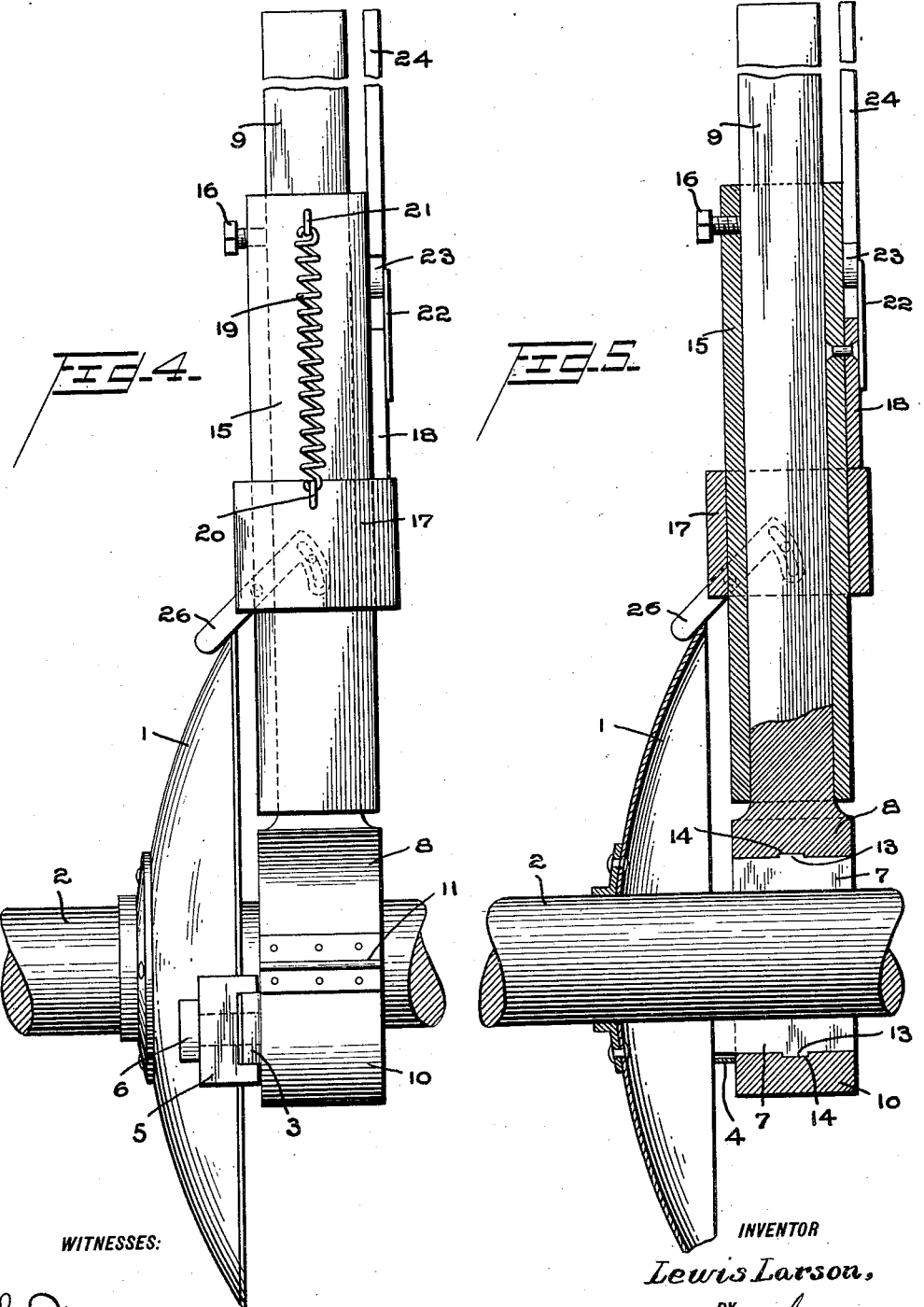

UNITED STATES PATENT OFFICE.

LEWIS LARSON, OF MALTA, ILLINOIS.

DISK-HARROW SHARPENER.

1,083,687.   Specification of Letters Patent.   Patented Jan. 6, 1914.

Application filed May 10, 1913. Serial No. 766,743.

*To all whom it may concern:*

Be it known that I, LEWIS LARSON, a citizen of the United States, and a resident of the city of Malta, county of Dekalb, and State of Illinois, have invented certain new and useful Improvements in Disk-Harrow Sharpeners, of which the following is a specification.

My invention relates to improvements in harrow disk sharpeners, the object of the invention being to provide a portable device which may be readily connected to any disk of the harrow, and effectually sharpen the same.

A further object is to provide an improved disk sharpener having means for clamping the disk and sharpening means connected to a lever mounted to oscillate upon the disk clamping means, and so construct the several parts that they may be readily assembled and operated by any one of average intelligence.

With these and other objects in view, the invention consists in certain novel features of construction and combinations and arrangements of parts as will be more fully hereinafter described and pointed out in the claims.

In the accompanying drawings: Figure 1 is a broken view in elevation illustrating my improvements in operative position on the disk of a harrow. Fig. 2 is a fragmentary view in elevation illustrating the sharpening device. Fig. 3 is a fragmentary view in section on the line 3—3 of Fig. 1. Fig. 4 is a view in elevation at right angles to Fig. 1, and Fig. 5 is a view in section on the line 5—5 of Fig. 1.

1 represents a harrow disk of the ordinary concavo-convex type supported upon a shaft 2.

3, 3, represent bars connected by a hinge 4, and at their outer ends provided with clamps 5 operated by set screws 6 to clamp the edges of disk 1. These bars 3, 3, at their hinged inner ends are made with integral semi-cylindrical half journals 7 which when the bars 3, 3, are in alinement encompass shaft 2 and provide rotary mounting for a bearing 8 on the end of a lever 9. This bearing 8 is provided with a half section 10 hinged at one side as shown at 11 and provided at its other side with a catch 12 to lock the bearing around the journal 7. An annular flange 13 on journal 7 projects into an internal annular groove 14 in bearing 8, so that longitudinal movement of the latter on the hub is prevented.

On lever 9, a sleeve 15 is adjustably mounted and locked in any position of adjustment by a set screw 16. On the sleeve 15, a collar 17 is mounted to slide, and is held against a cam 18 by means of a coiled spring 19. One end of this spring 19 is connected to an eye 20 on the end of collar 17, and the other end of the spring is connected to an eye 21 on sleeve 15.

A link 22 connects cam 18 with the shorter arm 23 of an angle lever 24, the latter pivotally connected to sleeve 15 as shown at 25 and having its free end positioned in proximity to the lever 9, so that this lever 24 may be readily manipulated to turn the cam 18 and move collar 17 toward disk 1 against the action of spring 19.

On collar 17, a sharpening device 26 is pivotally supported between its ends as shown at 27, and is adapted to bear against the convex side of the disk at its edge. The angle of this sharpening device is controlled by a set screw 28 located in a slot 29 in the inner end of sharpening device 26. This slot 29 is concentric with the pivot point 27, so that by loosening the set screw, the sharpening device can be adjusted to any angle and then secured in such position.

In operation, the bars 3—3 are first clamped in position on the disk 1, and then lever 9 with its bearing 8 is positioned on the journal 7. When the sharpening device 26 is in contact with the convex side of the disk, and lever 9 oscillated, at the same time pressure being applied to the sharpening device through the medium of lever 24, link 22 and cam 18, the disk will be effectually sharpened.

It will be noted that I have illustrated the lever 9, sleeve 15, and collar 17 as rectangular in cross section, and while this is a preferable arrangement to prevent independent rotary movement of any of said parts, I would have it understood that various slight changes might be made in the general form and arrangement of parts described without departing from my invention and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A disk sharpener comprising means for clamping a disk, a journal on said means, a lever, a bearing on said lever mounted to turn on the journal, a sleeve adjustable on the lever, a sharpening device movable on the sleeve, and means on the sleeve for pressing the sharpening device toward the disk, substantially as described.

2. A disk sharpener comprising means for clamping a disk, a journal on said means, a lever, a bearing on said lever mounted to turn on the journal, a sleeve adjustable on the lever, a collar mounted to slide on the sleeve, a spring tending to move the collar away from the disk, means for pressing the collar toward the disk, and a sharpening device on said collar, substantially as described.

3. A disk sharpener comprising means for clamping a disk, a journal on said means, a lever, a bearing on said lever mounted to turn on the journal, a sleeve adjustable on the lever, a collar mounted to slide on the sleeve, a spring tending to move the collar away from the disk, means for pressing the collar toward the disk, a sharpening device pivotally supported between its ends and having a slot in one end concentric with its pivotal point, and a set screw projected through said slot and screwed into the collar clamping the sharpening device against pivotal movement, substantially as described.

4. A disk sharpener comprising means for clamping a disk, a journal on said means, a lever, a bearing on said lever mounted to turn on the journal, a sleeve adjustable on the lever, a collar mounted to slide on the sleeve, a spring tending to move the collar away from the disk, means for pressing the collar toward the disk, a sharpening device on said collar, said collar moving means comprising a cam connected to the sleeve and engaging the collar, a lever connected to the sleeve and having its free end in proximity to the first-mentioned lever, and a link pivotally connecting the last-mentioned lever and the cam, substantially as described.

5. A disk sharpener comprising two bars hinged together, clamps on the free ends of said bars adapted to engage the edge of a disk, half journals on the hinged ends of said bars adapted to be positioned around a harrow shaft, and a disk sharpener mounted to oscillate on said bearing, substantially as described.

6. A disk sharpener comprising two bars hinged together, clamps on the free ends of said bars adapted to engage the edge of a disk, half journals on the hinged ends of said bars adapted to be positioned around a harrow shaft, a lever having an integral half bearing at one end, and a hinged half bearing connected to the integral half bearing and fitting around the journal, said journal and said bearing having a flange and groove interlock, and a disk sharpening device adjustable on said lever, substantially as described.

In testimony whereof I have signed my name to this specification in the presence of two subscribing witnesses.

LEWIS LARSON.

Witnesses:
HARVEY LARSON,
IRVING LARSON.

Copies of this patent may be obtained for five cents each, by addressing the "Commissioner of Patents, Washington, D. C."